United States Patent [19]

Byrne et al.

[11] 3,768,841
[45] Oct. 30, 1973

[54] PLASTIC PIPE JOINT
[75] Inventors: Michael F. Byrne, Long Island City, N.Y.; Douglas V. N. Powelson, Audubon, Pa.
[73] Assignee: Allied Chemical Corporation, New York, N.Y.
[22] Filed: Oct. 2, 1970
[21] Appl. No.: 77,489

Related U.S. Application Data
[63] Continuation-in-part of Ser. No. 868,139, Oct. 21, 1969, abandoned.

[52] U.S. Cl. ............... 285/21, 260/848, 285/370, 285/371, 285/423
[51] Int. Cl. ............................................. F16l 13/02
[58] Field of Search .................... 285/DIG. 25, 423, 285/21, 22, 370, 371, 397, 398; 260/897, 53, 848; 156/306, 158

[56] References Cited
UNITED STATES PATENTS
2,842,125 7/1958 Stephany .................. 285/DIG. 16
1,996,069 4/1935 Honel ........................... 260/53 R
2,364,192 12/1944 Churlton et al. ............. 260/53 R
2,725,246 11/1955 Weinhold ................... 285/371 X
3,219,728 11/1965 Joris et al. ................... 260/897 A FOREIGN PATENTS OR APPLICATIONS
1,014,803 8/1957 Germany ..................... 285/370

6,601,024 7/1967 Netherlands .................. 285/371

OTHER PUBLICATIONS
Rubber World, "Butyl Grafted to Polyethylene Yields Thermoplastic Elastomer" 6 pp. 59–64, Vol. 163 No. 1

Primary Examiner—Dave W. Arola
Attorney—Michael S. Jarosz

[57] ABSTRACT

An improved heat fused pipe assembly joint is provided using an internally positioned fitting having an annular insert portion substantially the same diameter as the internal diameter of the pipe section to be joined and a shoulder portion having a larger diameter. The pipe section is joined to the fitting by heating the pipe end sufficiently to soften it, heating the insert portion of the fitting so as to soften its exterior wall, inserting the fitting so that the end edge of the pipe section substantially abuts the shoulder portion of the fitting and crimping to cause fusion of the pipe to the fitting. For additional strength, the fused pipe joint assembly may be provided with an externally positioned sleeve.

10 Claims, 4 Drawing Figures

Patented Oct. 30, 1973 3,768,841

INVENTORS:
MICHAEL F. BYRNE
DOUGLAS V. N. POWELSON
BY
Birgit E. Morris
ATTORNEY

PLASTIC PIPE JOINT

This application is a continuation-in-part of our co-pending application Ser. No. 868,139 filed Oct. 21, 1969, and now abandoned.

BACKGROUND OF THE INVENTION

This invention relates to plastic pipe and to methods for joining same.

Thermoplastic materials, particularly high molecular weight polyethylene, have found widespread use in the manufacture of pipe. It is generally recognized that pipe made from thermoplastic material offers many advantages over the conventional copper, steel or iron pipes, in that the former is lightweight, corrosion-resistant, and economical to produce.

DESRIPTION OF THE PRIOR ART

Joining thermoplastic pipe sections has been accomplished by conventional mechanical means, such as thread joints and flange connections; by chemcial means, such as solvent welding; and by thermal means, such as heat welding. However, in many applications mechanical joints are unacceptable because they are not fluid-tight and because assembly is time-consuming, expensive and cumbersome. Solvent welding requires some degree of care in applying the solvent to the surface of the articles to be joined. Further, some thermoplastic materials are inert to conventional solvents used for solvent welding and, therefore, the pipe sections have to be joined primarily by mechanical means or by thermowelding.

One of the methods used for thermowelding plastic pipe sections, particularly polyethylene pipe sections, has involved the use of welded or fused fittings. These fittings are of external design. When using conventional fittings, polyethylene pipe sections are joined by inserting the pipe ends into a fitting having flared or belled ends. Thus, conventional fittings are designated as socket couplings or fittings and the inside diameter of the ends of the fitting are substantially identical to the outside dimensions of the pipe.

One of the disadvantages in the use of such fittings is that they tend to develop cracks at the jointure when subjected to stress rupture conditions, such as recurring vibrations, flexations or severe changes of pressure or temperature. Thus, according to the methods taught by the prior art, it has been impossible to join polyethylene pipe in a satisfactory manner, i.e., so that the strength of the joined section approaches the cohesive strength of the pipe itself.

Thus an improved method for joining polyethylene pipe, wherein the joined sections are not subject to crack stress rupturing, has long been sought in the art.

SUMMARY OF THE INVENTION

It is an object of the present invention to provide a method for joining high molecular weight polyethylene pipe sections whereby the joint is at least as strong as the pipe itself with respect to resistance to stress rupture. Another object is to provide internal fittings which can be used to polyethylene pipe sections forming a strong joint assembly. Further objects will become apparent from the following detailed description thereof.

According to the present invention, we have discovered that high molecular weight polyethylene pipe sections can be joined together by means of certain polyolefin fittings having an annular insert portion which has an outside diameter substantially the same as the inside diameter of the pipe section to be joined and a shoulder portion having a larger diameter. A strong joined assembly of the ends of the pipe sections fused to the fittings can be made by heating the ends of the pipe until the entire cross section is softened, heating the outside of the insert portion of the fitting to soften the exterior surface only, inserting the fitting into the pipe end so that the edge of the pipe substantially abuts the shoulder of the insert and crimping the pipe end to ensure good contact of the internal wall of the pipe and the external surface of the fitting and effect fusion therebetween.

For additional strength the joint may be fitted with an externally positioned sleeve.

The invention will be more readily understood from the following description given with reference to the accompanying drawings showing suitable fittings and the formation of a joint between pipe sections using the fittings of the invention.

DETAILED DESCRIPTION OF THE INVENTION

Figure 1:
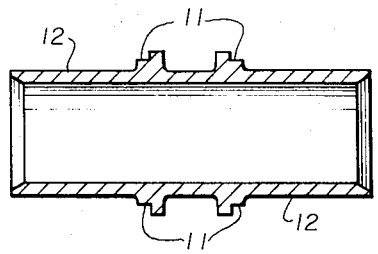
FIG. 1 shows an axial sectional view of a straight fitting.

Referring to FIG. 1, the fitting illustrated is one that affords a straight line joint. The outside diameter of the shoulder portion 11 must be greater than the outside diameter of the insert portion 12.

Figure 2:
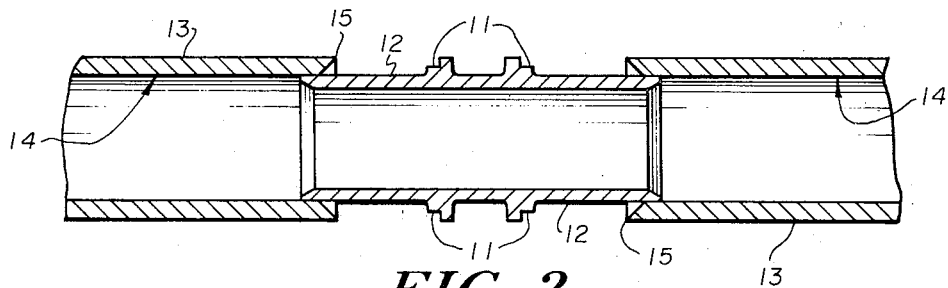
FIG. 2 shows an axial sectional view through the parts of a joint prior to formation of the joint.

FIG. 2 shows the fitting of FIG. 1 as it is being positioned inside the end of a pipe 13. The outside diameter of the insert portion 12 must be substantially the same as the diameter of the inside walls of the pipe 14. By "substantially the same" is meant the insert portion of the coupling should be the same as the opening of the pipe to ensure a tight fit. However the diameter may be up to about 0.050 inch greater or smaller than the pipe opening. The end of the pipe 15 preferably has a bevelled edge to facilitate insertion of the insert portion 12. The exact diameter of the shoulder 11 is not critical except that it must be larger than the diameter of the insert 12 to provide an abuttment or stop for the edge of the pipe 15. Preferably the diameter of the shoulder 11 extends to at least one-half the distance between the internal walls of the pipe 14 and the external wall 13 and most preferably is about the same as the external diameter of the pipe.

Figure 3:
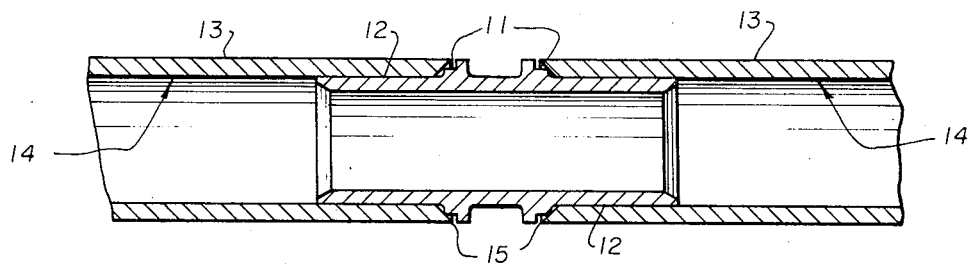
FIG. 3 shows an axial sectional view through a fused joint after formation thereof.

FIG. 3 illustrates the fused joint assembly wherein the edges of the pipe 15 have been abutted against the shoulder 11 and the insert portion of the fitting fused to the inside wall of the pipe.

Figure 4:
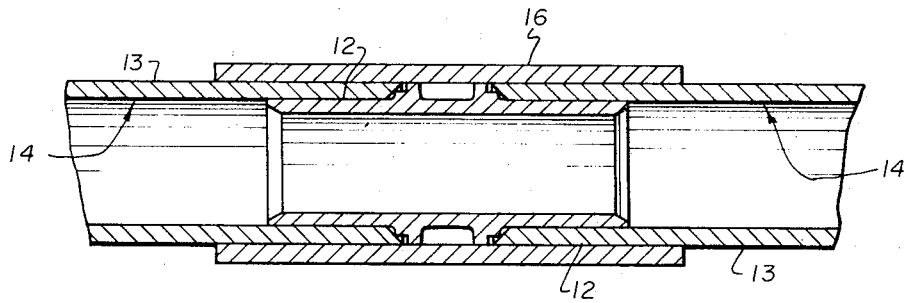
FIG. 4 shows the fused joint fitted with an external sleeve.

The joint assembly shown by FIG. 3 can be optionally fitted with an externally positioned sleeve in the manner shown by FIG. 4. The sleeve 16 may be a single element comprising a tubular member having an inside configuration molded to conform to the external walls of the pipe assembly, as shown in FIG. 4, or may be of a split design wherein each half of the sleeve encases and sandwiches the pipe joint assembly. When the sleeve 16 is a single tubular member, it must be fitted over the pipe prior to joining and fusing the pipe to the internally positioned fitting. After fusion is effected, the external sleeve is slipped up over the fused area and secured to the pipe. When the supporting sleeve is of a split design, it may be assembled and secured to the pipe after the pipe is joined and fused. Preferably, the sleeve should have tapering ends to assure control of creep of the pipe and thus eliminate a point of high stress. The sleeve 16 may be secured to the joined pipe assembly by mechanical means, such as by bands or interlocking members, or may be secured by a fusion method (not shown).

Although FIGS. 1 to 4 illustrate the invention as it relates to joining pipe sections of the same size, pipe sections having different sizes may be similarly joined by proper changes in the fitting design. The relative length of the insert and shoulder portions of the fitting is not critical. In general the insert portion of the fitting should be as long as the inside diameter of the pipe, and the shoulder portion should be at least one-half as long as the insert portion. In addition, the joint assembly of the invention is not restricted to that formed by a straight fitting, and the fitting of FIG. 1 may correspond to shapes such as a "T," "Y," "elbow," "T saddle" or the reducing counterparts thereof, wherein at least one end is adapted so that it may be inserted into the end of a pipe section as indicated above and as illustrated in FIGS. 1 to 4. The fitting may be open at both ends, or may be stopped to provide an end for the pipe.

Prior to joining the pipe sections together, preferably the ends of the pipe are bevelled or chamfered. This will allow the fitting to be inserted more readily into the pipe.

To join the pipe sections, the end of the pipe is heated at about 470°–530° F. until it has softened, but not melted. The external wall only of the insert portion of the fitting is also heated at similar temperature. The insert portion of the fitting is then inserted into the pipe until the edge of the pipe substantially abuts the shoulder portion of the fitting, and a crimping means promptly affixed to ensure good contact between the internal walls of the pipe and the external wall of the insert portion of the fitting until fusion has taken place at the interface.

The pipe and fitting can be heated in any convenient manner. One particularly effective heat supply means is a commercially available electrically or gas heated tool having two surfaces; a female face to heat the external wall of the insert portion of the fitting, and a male face to heat the end of the pipe. The amount of heat supplied to the respective parts is that amount necessary to effect softening of the material without significantly altering structural integrity. It is particularly important that only the external wall of the fitting insert portion be softened, since otherwise the joint may collapse or wrinkle during the crimping step. Thus the end of the pipe, which is to be softened throughout its cross section, is heated for a longer time than the fitting insert portion, which cannot be heated for the same period of time.

In the case where an external sleeve is employed, it is then slipped over the joined assembly wherein it is secured in place by heat fusion or by mechanical means as will be known to one skilled in the art.

From the drawings and above description it is apparent that in forming the joined pipe assembly according to the present invention there is no intentional deformity of the pipe ends or the fittings. Thus the contacting surfaces are smooth and devoid of serrations or corrugations commonly used to increase frictional engagement between opposing surfaces, and there is no substantial expansion or contraction or flaring of the pipe ends or fittings. This is not to say, however, that there may not be some minor necking down of the pipe and fitting when the fitting is crimped during heat fusion.

The present invention is useful for joining pipes made of high molecular weight polyethylene, especially high density polyethylene of the type described in U.S. Pat. Nos. 3,219,728 and 3,050,514 or as exemplified in U.S. Pat. Nos. 2,825,721 and 2,951,816. In particular the pipe material is derived from a polyethylene having a density of about 0.937–0.965 and a molecular weight of between about 400,000 to 1,500,000, preferably 400,000 to 1,000,000. The polyethylene used for the pipe can be a homopolymer of ethylene or can contain up to about 3 percent by weight of another $\alpha$-olefin copolymerized therewith, such as butene or hexene-1.

The fitting material found most suitable according to the invention for high molecular weight polyethylene pipe, is a graft polymer of ethylene containing butyl rubber and a bifunctional phenolic composition as a cross-linking agent. These polymers are formed by heating together a polymer of ethylene having a molecular weight of at least 8,000, preferably above 20,000, and a density of 0.940–0.950, preferably 0.945–0.950, with from about 5.0 to about 15.0 percent by weight of the polyethylene of a butyl rubber elastomer and from about 0.30 to about 2.5 percent by weight of the polyethylene of a bifunctional phenolic resin.

The butyl rubber suitable for use in preparing the graft copolymer is a copolymer of isobutylene and a diolefin such that the copolymer has about 0.75 to 3 percent unsaturation, referring to the percent of diolefin units in the polymer chain which contain a double bond. Suitable diolefins have about four to eight carbon atoms and include, for example, isoprene, butadiene, piperylene, 2,3-dimethyl-1,3-butadiene, 3-methyl-1,3-pentadiene, 2-methyl-1,3-pentadiene, 1,3-hexadiene and 2,4-hexadiene. Isoprene is the preferred diolefin. The butyl rubbers generally contain up to 15 percent by weight of the copolymer of diolefin, preferably between about 1 percent and 8 percent by weight.

The bifunctional phenolic compounds employed in the invention may be essentially either monomeric bifunctional phenols or polymeric bifunctional phenols, in either case having their functionality in the ortho positions, with the para position substituted with an essentially inert substituent, such as alkyl, alkylaryl or arylalkyl radical of up to about 16 carbon atoms, preferably four to 12 carbon atoms. The more preferred phenolic compounds are the polymeric or so-called condensed bifunctional phenolic compounds. The ortho functionality of the suitable phenols is usually provided by a hydroxy or halogen substituent, the latter preferably being chlorine or bromine.

Preferred monomeric bifunctional phenols include the phenol dialcohols and halogen derivatives thereof, the phenol dialcohols being well known and typically prepared by reaction of a para-substituted phenol with an excess of an aldehyde, preferably formaldehyde, in the presence of an alkali. Preparation of such dialcohols is described in U.S. Pat. No. 1,996,069 to Honel and in U.S. Pat. No. 2,364,192 to Carlton et al. The phenol dialcohols are distinguished from the phenols not containing ortho groups such as methylol groups, those not containing such groups being typically prepared in acidic medium with reduced amounts of aldehyde. The suitable phenol dialcohols are also distinguised from those not having an inert substituent in the para position and which react in all three positions to form insoluble, infusible thermosetting resins. The para-substituted phenol dialcohols employed in the present invention therefore contain only two reactive groups and undergo only linear condensation. Examples of suitable monomeric phenol dialcohols include 2,6-dimethylol-4-tert-butylphenol, 2,6-dimethylol-4-octylphenol, 2,6-dimethylol-4-phenylphenol, 2,6-dimethylol-4-benzylphenol, 2,6-dimethylol-4-(alpha, alpha-dimethylbenzyl)phenol, 2,6-dimethyl-4-dodecylphenol, and 2,6-dimethylol-4-cyclohexylphenol.

The polymeric bifunctional phenols most preferably employed in the invention may be considered condensation polymers of the phenol dialcohols. Preparation of the polymeric bifunctional phenols from para-substituted phenols and aldehydes is described, for example, in the Carswell Volume entitled "Phenoplasts", Interscience Publishers, New York, 1950, especially on pages 17–22. The halogen substituted bifunctional phenols are also especially suitable and may be prepared by halogenation of the polymeric phenols by conventional methods. The halogenated phenols, especially the brominated polymeric phenols, are generally preferred because of their high activity by themselves without use of catalyst. An example of an especially preferred compound is a brominated hydroxymethylphenol having the following approximate structural formula:

(1)
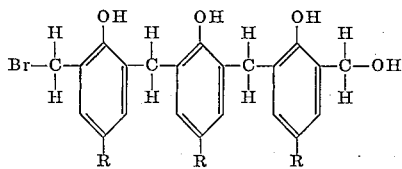

The above monobromo phenolic compound, as prepared by conventional procedures, is typically in admixture with minor amounts of the dibrominated product and dihydroxymethylphenol starting material. The higher activity of the halogenated phenols is believed to be attributable to the release of acidic hydrogen halide during the grafting reaction. This is supported by the fact that the somewhat slower-acting hydroxymethylphenols graft faster in an acidic reaction system. It will thus be evident that an acid catalyst, including acid salts, may be added as accelerators if desired when employing the dihydroxyalkylphenols. Examples of such conventional acid catalysts include p-toluene sulfonic acid, stannous chloride and zinc chloride.

The graft copolymers found useful according to the invention are prepared by heating a thorough mixture of the ethylene polymer, elastomer and bifunctional phenolic grafting vehicle at elevated temperatures sufficient to effect the grafting reaction. Mixing and reaction of the components may be carried out in conventional equipment including a two-roll rubber mill, Banbury-type mixer or extruder. The ethylene polymer and elastomer may be pre-blended with or without the phenolic material. In all procedures, intimate and thorough mixing of the components including the phenolic material is important to obtain optimum results. The grafting reaction itself is generally effected by heating the mixed components, desirably while maintaining mixing, to a temperature from about 250° to 425° F. A temperature of at least about 250° F. is usually the minimum required to effect the grafting reaction, depending largely on the particular phenolic material employed. Temperatures substantially in excess of about 425° F. should be avoided since they tend to cause undesirable side reactions, including a tendency on the part of the phenolic material to polymerize or condense with itself, thus denying the availability of this component for the grafting reaction. Preferred temperatures are in the range of about 300° to 375° F. Time for the grafting may vary widely depending on the amounts of butyl rubber to be grafted and the phenolic material present as well as the temperature employed. Substantial grafting can be effected in as little as one minute at higher temperatures and higher proportions of butyl rubber and phenolic material. Times in excess of about 30 minutes may be employed but usually provide no additional advantage or grafting and hence are unnecessary as a practical matter. In the more preferred embodiments the mixture is maintained at grafting temperatures for between about 5 to 20 minutes. Additives such as conventional fillers, stabilizers, pigments and the like may be admixed with the graft copolymers either before, during, or after the grafting reaction. Such procedure produces graft copolymers having apparently lower melt indexes but having lower torque, as measured in a standard Plastograph.

A particularly preferred graft copolymer was formulated as follows: 87.5 parts of a polyethylene having a density 0.940 and melt index of 0.16, 12.5 parts of a butyl rubber of polyisobutylene and isoprene having 1.4 percent unsaturation, 1.25 parts of brominated phenolic resin having the approximate formula as Formula 1 sold as SP-1055 of Schenectady Chemical Co. and 0.25 parts of zinc dibutyl dithiocarbamate as an antioxidant were charged to a rubber mill at 325°–350° F. for about 6 minutes. The temperature was increased to 350°–400° F. and milling continued for 1 minute longer. The resultant graft polymer was molded at 440°–460° F. to form a straight fitting as shown in FIG. 1, wherein the insert portion was designed to fit a ¾ inch pipe. This fitting was utilized to join two ultra high molecular weight polyethylene ¾ inch pipe sections as follows: (a) one end of one pipe section (¾ inch SDR-11 pipe of Allied Chemical Corporation) was chamfered; (b) the chamfered end of the pipe positioned over the male end of a heating tool having a male heating element and a female heating element maintained at 500° F. ± 30° F. and heated for 10 seconds; at which time (c) the insert portion of the fitting was inserted into the female end of the heating tool and heating of the pipe end and fitting continued for 5 seconds; (d) the pipe and fitting were removed from the heating tool together and the insert portion of the fitting forced into the pipe end until the edge of the pipe substantially reached the shoulder portion of the fitting; (e) a crimping device was immediately attached to the joined assembly and (f) removed after one minute. The above procedure was repeated with the other pipe section. A fused assembly was formed which was highly resistant to stress cracking. After testing according to ASTM test D 1598, the pipe walls failed before the joint.

Similarly, the external sleeve when used as a reinforcing member in the present invention should be derived from a material having strength characteristics sufficient to control creep of joint, particularly in those instances where the pipe is utilized to convey materials under pressure, such as illuminating and heating gases or water. Thus, in addition to the aforementioned thermoplastic materials, materials having tensile modulus of at least 400,000 psi (as determined by ASTM test D-638) are particularly suitable for use to form the externally positioned sleeve. Representative examples of these materials include polyphenylene oxide, glass filled polyethylene, polycarbonate and polyvinyl chloride.

We claim:

1. A heat fused polyethylene pipe joint assembly comprising an end portion of a pipe section of polyethylene having a molecular weight of between about 400,000 to about 1,500,000 and a density of about 0.937–0.965 fused to the insert portion of an annular insert fitting, said fitting having an insert portion whose outer diameter is substantially the same as the inner diameter of said pipe and a shoulder portion having an outer diameter larger than the inner diameter of said pipe, positioned so that the edge of said pipe section substantially abuts the leading edge of said shoulder portion, the fitting being preformed of a polymer reaction product of a polyethylene polymer or copolymer having a molecular weight of at least about 8,000, a density of 0.940 –0.950, with from about 5.0 to 15.0 percent by weight of the polyethylene of a butyl rubber and from about 0.30 to about 2.5 percent by weight of the polyethylene of a bifunctional phenolic composition having ortho functionality and the para position of the phenol ring substituted with an inert hydrocarbon radical selected from the group consisting of alkyl, aryl, alkaryl and aralkyl radicals of up to 16 carbon atoms.

2. A pipe joint assembly according to claim 1 wherein the polymer of ethylene has a molecular weight in the range from 400,000 to 1,000,000.

3. A pipe joint assembly according to claim 1 wherein the butyl rubber is a copolymer of isobutylene and up to 15 percent by weight of a diolefin of four to eight carbon atoms having 0.75 to 3 percent unsaturation.

4. A pipe joint assembly according to claim 3 wherein the diolefin is isoprene.

5. A pipe joint assembly according to claim 4 wherein the isoprene is present in an amount of 1–8 percent by weight of the copolymer.

6. A pipe joint assembly according to claim 1 wherein the phenolic composition is a polymer of a phenol dialcohol.

7. A pipe joint assembly according to claim 1 wherein the phenolic composition is a monobrominated polymer of a phenol dialcohol.

8. A pipe joint assembly according to claim 1 wherein the butyl rubber is a copolymer of isobutylene and from 1 to 8 percent by weight of isoprene having 0.75 percent to 3 percent unsaturation, and the phenolic composition is a monobrominated polymer of a phenol dialcohol.

9. A pipe joint assembly according to claim 1 additionally fitted with an externally positioned sleeve.

10. A pipe joint assembly according to claim 9 wherein the sleeve is preformed from a thermoplastic material having a tensile modulus of at least 400,000 psi.

* * * * *